J. & W. F. BARNES.
SCROLL SAW.
No. 172,951. Patented Feb. 1, 1876.
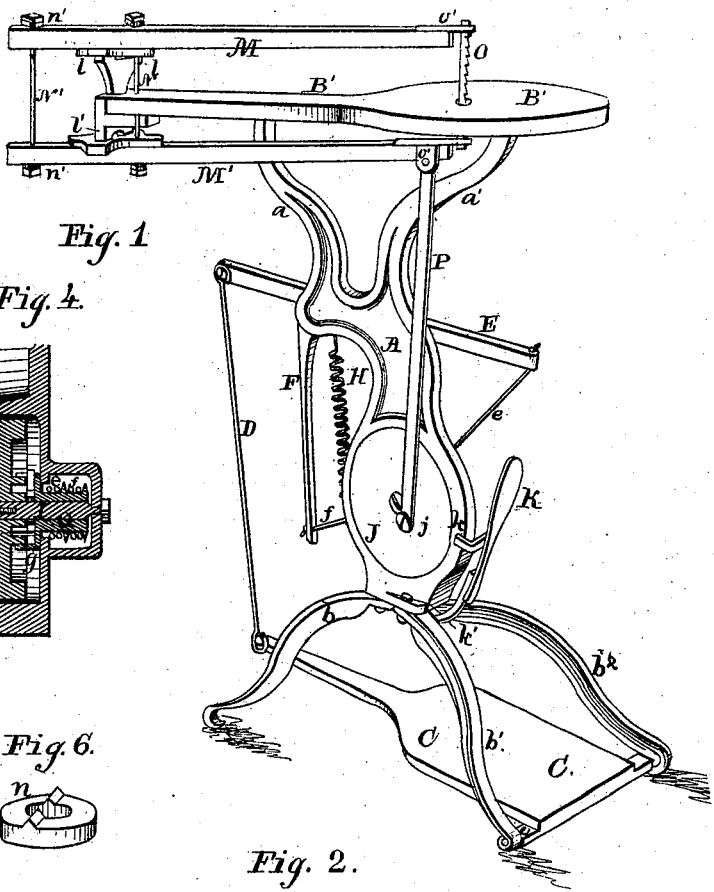
Fig. 1.
Fig. 3. Fig. 4.
Fig. 5. Fig. 6.
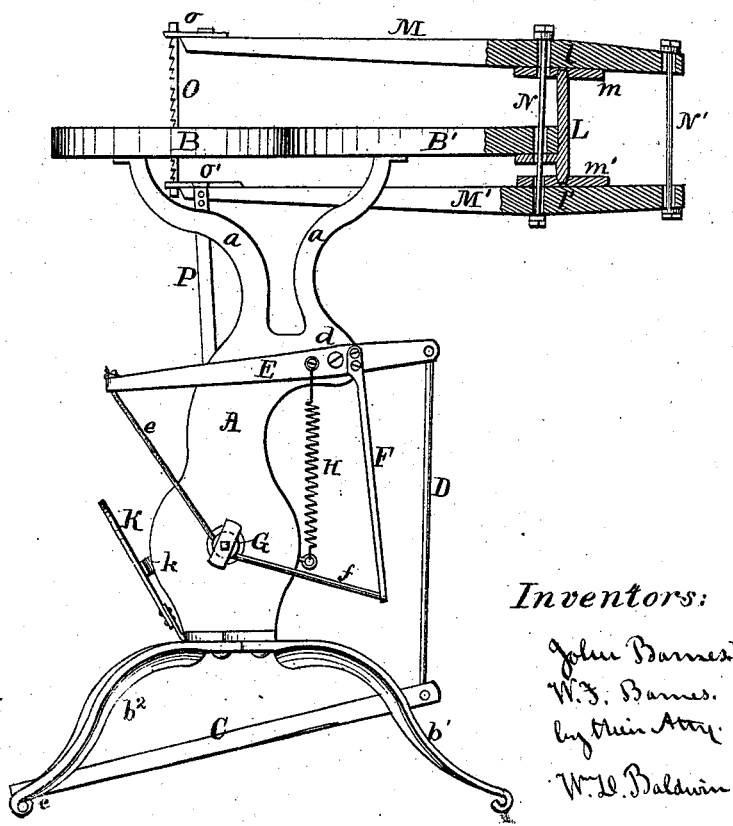
Fig. 2.
Witnesses:
W. H. Rowe.
Joe S. Peyton.
Inventors:
John Barnes
W. F. Barnes.
by their Atty.
W. H. Baldwin.
N. PETERS, PHOTO-LITHOGRAPHER, WASHINGTON, D.C.

UNITED STATES PATENT OFFICE.

JOHN BARNES AND WILLIAM F. BARNES, OF ROCKFORD, ILLINOIS.

IMPROVEMENT IN SCROLL-SAWS.

Specification forming part of Letters Patent No. 172,951, dated February 1, 1876; application filed March 14, 1872.

*To all whom it may concern:*

Be it known that we, JOHN BARNES and WILLIAM F. BARNES, both of Rockford, in the county of Winnebago and State of Illinois, have invented certain new and useful Improvements in Scroll-Saws, of which the following is a specification:

Our improved machine is more especially adapted for working in light material, requiring but little power and a quick movement, and it may easily be driven by the operator with one foot.

The subject-matter claimed will hereinafter specifically be designated.

In the accompanying drawings, which show all our improvements as embodied in one machine, in the best way now known to us—

Figure 1 is a perspective view of our improved machine; Fig. 2, an elevation, partly in section, of the side opposite to that shown in Fig. 1; Figs. 3, 4, and 5 are enlarged views of details of the mechanism for converting the vibrating motion of the treadle into a rotary motion; and Fig. 6 an enlarged view, in perspective, of the V-edged washer, hereinafter described.

A frame, A, preferably of cast-iron, formed with branching arms $a$ $a^1$, for supporting a table, B, rests upon suitable legs $b$ $b^1$ $b^2$, arranged so that two of them form bearings for a cross-bar, $c$, which is attached to a treadle, C, and extends across the front of the machine.

The vibrating end of the treadle is connected by a rod, $d$, with a vibrating lever, E, that is pivoted at $d$ to the frame; or the treadle may be connected directly to a belt or driving-pulley, such as hereinafter described. An arm, F, projects from the vibrating lever, and cords or belts $e$ and $f$ are attached respectively to the end of the lever E and arm F, and pass in opposite directions around a driving-pulley, G, so that the pulley is moved alternately in opposite directions by the vibrations of the lever.

To return the treadle to a position to be again operated upon after having been pressed down by the foot, a retracting-spring, H, is attached at one end to the frame of the machine, and at the other to the lever, so that when one end of the lever is drawn down by the pressure of the foot of the operator upon the treadle the other end of the lever and the treadle are drawn back by the action of the spring when the pressure from the foot ceases.

The driving-pulley G is journaled and turns freely upon a stud-axle, I, which is secured to the frame of the machine. To cause the driving-pulley to engage with a balance or driven wheel, J, when rotated in one direction, and disengage therefrom when its direction of rotation is reversed, the pulley is shown as formed with a flange, $g$, which encircles a part of the hub of the balance-wheel, also turning freely upon the stud-axle, and with a locking-lever, $g^1$, encircling the stud-axle and bearing at one end against the flange of the driving-pulley, while a dog at the other end of the lever enters an annular groove in the hub of the balance-wheel. This lever is formed so that when it is turned in one direction by the driving-pulley the dog is thrown crosswise of the groove in the hub of the wheel, and is jammed against the walls of the groove, thus clutching together the driving-pulley and balance-wheel, and causing the balance-wheel to revolve in the same direction as the driving-pulley. When the lever is turned in the opposite direction by the driving-pulley, the dog releases its hold upon the hub, thus unclutching the balance-wheel, which is left free to continue its revolution until its momentum is overcome. A continuance of these impulses from the locking-lever of the clutch will keep the machine in operation.

The stud I, it will be seen, is supported in the frame at one end only, and is inclosed by a cap or projecting casing or collar, $I^1$. By mounting the balance-wheel upon its stud, as shown, in a recess in the frame, it is out of the way, and, moreover, serves as a support for the outer end of the stud, to prevent lateral strain or sidewise motion thereof, as the wheel fits snugly in the recess of the frame, the walls of which afford a bearing for it.

A brake-lever, K, with a spur, $k$, placed opposite the balance-wheel, is hinged or joined by a spring-plate, $k^1$, to the frame of the machine between the legs $b^1$ $b^2$, which support the treadle. The brake is placed directly above the treadle and within convenient reach of the knee of the operator, so that he can regulate the motion of the balance-wheel with one leg, and thus allow him the free use of his arms to guide and control the work upon the table.

The table B is of a circular form at the front, but is formed with an extension or elongated portion, B', which extends back some distance, and to the end of which we secure a bracket, L, which projects both above and below the table to form fulcrums for the arms of a vibrating saw-frame.

By the extension of the table the necessity of employing a supplementary bracket or separate frame to support the saw-frame is avoided. Ample room is obtained between the bracket and saw for manipulating the work, and by making the extension B' narrow, as shown, work projecting below the plane of the table can be swung around almost in a complete circle, thus affording facility for manipulation.

A saw-frame is formed of arms M M', which are placed one above and the other beneath the table, in line with the extension or elongated part thereof. The arms have plates $m$ $m'$ secured to them, that are formed with recesses in them to receive V-shaped projections $l$ $l$ and $l'$ $l'$ of the bracket L, which is secured to the end of the elongated part of the table. Rods N N', one on each side of the bracket L, serve to brace and connect the saw-arms, and keep them in proper position upon the bracket. But one rod only might be used, if desired, with very good effect.

As the saw-frame arms M M' vibrate upon different fulcrums, these rods N N' will receive a rocking motion from the vibrating arms, and to prevent unnecessary strain upon the rods, and friction between the heads of the rods and the arms, we make the holes in the arms through which the rods pass of an oblong form, and place a washer, $n$, of peculiar construction between the head of the rod N and the saw-arm.

This washer is shown in detail in Fig. 6, and is formed with a V ledge or rib on one of its faces, which is placed crosswise the arm, so that when the strain-rods oscillate, the oblong holes will allow them to rock freely through the arms, and the bolt-heads will rock upon the rib of the washer without unnecessary friction.

We accomplish the same object by placing a rubber washer, $n'$, between the head of the rod N' and saw-arms, which also serves as a cushion to relieve the saw-arms of sudden strains, and, furthermore, prevents the saw-arms from leaving their bearings when the saw is being removed, or is accidentally broken.

A saw-blade, O, is connected to the vibrating ends of the saw-arms by means of notched adjustable plates $o$ $o'$, so that the saw is held in place by the elasticity of the arms, and may easily be removed or replaced. A pitman, P, is joined at one end to the plate $o'$, on the lower arm, and at the other to a crank-pin, $j$, on the balance-wheel, J, and thus serves to communicate motion to the vibrating saw-frame.

By arranging the rods N N' on each side of the pivots, the saw-arms may be adjusted to suit different lengths of saw-blades.

By means of the peculiar form of the bracket, and the mode of connecting it with the saw-arms, as herein described, we are enabled to do away with the outside frame-work, and thus secure more room for accommodating the work on the table.

Many other advantages resulting from the combinations above described will readily occur to any one having a knowledge of the practical working of this class of machines, and it is unnecessary to further mention them here.

We claim as our invention—

1. The combination of the table, its extension, the bracket mounted thereon, and the saw-frame vibrating on the bracket, substantially as set forth.

2. The combination of the frame of the machine, the treadle for driving the machine, pivoted to the branching legs of the frame, the connecting-rod, the vibrating lever, provided with an arm and driving-belts for encircling and rotating the driving-pulley, and the retracting-spring, attached at one end to the frame of the machine, and at the other to the vibrating lever, all these parts being constructed and operating as set forth.

3. The combination of the frame, the branching legs, the treadle for driving the machine, pivoted to the legs, a balance-wheel on the frame, and a brake-lever attached to the frame between the legs and above the treadle, substantially as set forth, so that the operator can work the treadle with his foot, and the brake-lever with his knee.

4. The combination of the frame, the table mounted thereon, its extension, the bracket mounted on the table-extension, the saw-arms fulcrumed independently on the bracket, and the rods on opposite sides of the bracket, these parts being constructed and operating substantially as set forth, to retain the saw-arms upon their fulcrums.

5. The combination of the frame, the bracket, the saw-arms, fulcrumed independently on the bracket, the strain-rod, and a washer provided with a V edge or rib between the end of the rod and the saw-arm, substantially as described.

6. The combination of the frame, the treadle, mechanism for connecting the treadle and driving-pulley arranged on one side of the frame, the driving-pulley, the balance-wheel arranged within the frame, and the pitman connecting the balance-wheel and vibrating saw-frame, arranged on the opposite side of the frame from the treadle-connecting mechanism, all these parts being constructed, arranged, and operating substantially as set forth.

JOHN BARNES.
WILLIAM F. BARNES.

Witnesses:
GEORGE E. KING,
CASSIUS C. JONES.